United States Patent [19]

Beattie et al.

[11] Patent Number: 4,917,048

[45] Date of Patent: Apr. 17, 1990

[54] AUTOMATIC TRAPPING SYSTEM

[76] Inventors: John Beattie, 1 Vaughan Street, Mareeba, Queensland, Australia, 4880; Peter J. Marriott, C/- Post Office, Crocodile Station, Lakeland Downs, Queensland, Australia; Don Blanch, C/- Post Office, Walkamin, Queensland, Australia, 4872

[21] Appl. No.: 244,143

[22] Filed: Sep. 14, 1988

[30] Foreign Application Priority Data

Sep. 15, 1987 [AU] Australia ................................ PI4355

[51] Int. Cl.⁴ ................................................ A01K 3/00
[52] U.S. Cl. ........................................ 119/20; 119/155
[58] Field of Search ................ 119/96, 155, 20, 15; 256/16

[56] References Cited

U.S. PATENT DOCUMENTS

| | | | |
|---|---|---|---|
| 4,275,685 | 6/1981 | Hopkins | 119/155 X |
| 4,721,061 | 1/1988 | McNatt | 119/20 |
| 4,829,936 | 5/1989 | Mollhagen | 119/20 X |

FOREIGN PATENT DOCUMENTS 2221072 10/1974 France ................................ 119/155

Primary Examiner—Robert P. Swiatek
Assistant Examiner—T. Manahan
Attorney, Agent, or Firm—Renner, Otto, Boisselle & Sklar

[57] ABSTRACT

Trapping apparatus for livestock comprising a first barrier partially defining an enclosed area and having an entrance for admitting livestock into the enclosed area, a rotatable gate extending between the open ends of the first barrer and rotatable about a vertical support to sweep the enclosed area, a second barrier extending between one end of the first barrier and the gate support, and a detector for detecting livestock located within the enclosed area and arranged to initiate rotation of the gate whereby livestock located in the enclosed area are forced through an opening between the gate support and the other end of the first barrier.

7 Claims, 4 Drawing Sheets

AUTOMATIC TRAPPING SYSTEM

BACKGROUND OF THE INVENTION

This invention relates to apparatus for automatically trapping livestock within the perimeter of a bounded area. One application is trapping free range livestock and confining them within a fenced area or diverting livestock to a selected area. Accordingly, the invention has particular application for recovery of livestock which have escaped from a fenced area or for restricting the movement of livestock to a selected area.

The invention has particular application to portable animal trapping apparatus which can be transported in a disassembled form and erected at a selected position in an existing fence.

SUMMARY OF THE INVENTION

In a general form, the present invention is an automatic trapping apparatus for trapping livestock comprising first barrier means extending part way around a periphery, gate means rotatably mounted on support means located mid-way between the ends of said first barrier means for rotation about a vertical axis and comprising a first one or more leaves extending between said support means and one end of said first barrier means and a second one or more leaves extending between said support means and the other end of said first barrier means, an inlet in said first barrier means to admit livestock within the area bounded by said barrier means and said gate means, second barrier means extending between said one end of said first barrier means and said support means and arranged to allow passage therethrough of said gate means when said gate means is rotated; detector means to detect the presence of livestock within the area bounded by said first barrier means and said gate means, actuator means adapted to rotate said gate means on detection of livestock within said area whereby when livestock are detected by said detector means said gate means rotates with said second one or more leaves moving outwardly to provide an outlet from the area bounded by said first and second barrier means and said first one or more leaves move inwardly across said bounded area and said inlet forcing livestock in said bounded area through the opening provided by the outward movement of said second one or more leaves.

Preferably, the invention includes means to halt rotation of the gate means when the one or more leaves which move across the bounded area occupy the closed position initially occupied by the other one or more leaves.

In one embodiment, the first barrier means may comprise separable prefabricated panels which can be detached for transport and erected at any chosen location in a fence opening. In operation, the trapping apparatus will then be erected at an opening in a fence enclosing a selected area with each end of the first barrier means being connected to appropriately spaced ends of the fence.

The gate means, the support means and the second barrier means are conveniently constructed as a unit which is connectible to the first barrier means. Means for rotating the gate means may be included in the unit. If desired this unit may, for convenience, be fabricated as separable components which may be assembled in situ.

A suitable construction of gate means is provided by individual horizontally extending leaves superposed vertically and spaced apart on the support means to rotate about vertically spaced members that are supported on one end of the first barrier means and the leaves are rotatably connected at their other end to the support means. The leaves may be arranged to form two panels approximately 180 degrees apart.

The first barrier means may include means, such as feed means, to attract livestock into the area bounded by the trapping apparatus and located at a position adjacent the outlet provided by opening of the gate means. The detector means may be arranged to detect livestock in the vicinity of the feed means. The detector means are conveniently in the form of photo-electric means. However, other sensor means may also be used where photo electric means are rendered unsuitable for various reasons such as fog or mist. The detector means may suitably be powered by battery means or solar cells.

Actuating means may be provided by an electric motor connected to a rotatable shaft carrying the gate means. The motor may conveniently be driven by a motor vehicle battery and connected to the rotatable shaft by speed reducing gear means. The actuating means may include a limit switch to halt rotation when the gate means assumes a closed position following rotation after opening. The actuating means may also include clutch means to avoid overload of the motor when the gate is obstructed, for example, by livestock. One form of suitable clutch means permits the gate to exert a predetermined pressure on obstructing livestock to urge the livestock through the opening provided by rotation of the gate.

Means may also be provided to count animals trapped by the trapping apparatus. Such counting means may be associated with signal means such as a radio transmitter to signal the counting record to a station either for recording purposes or for initiating other actions in relation to the animals processed by the trapping apparatus.

DETAILED DESCRIPTION OF THE PREFERRED EMBODIMENT

Figure 1:
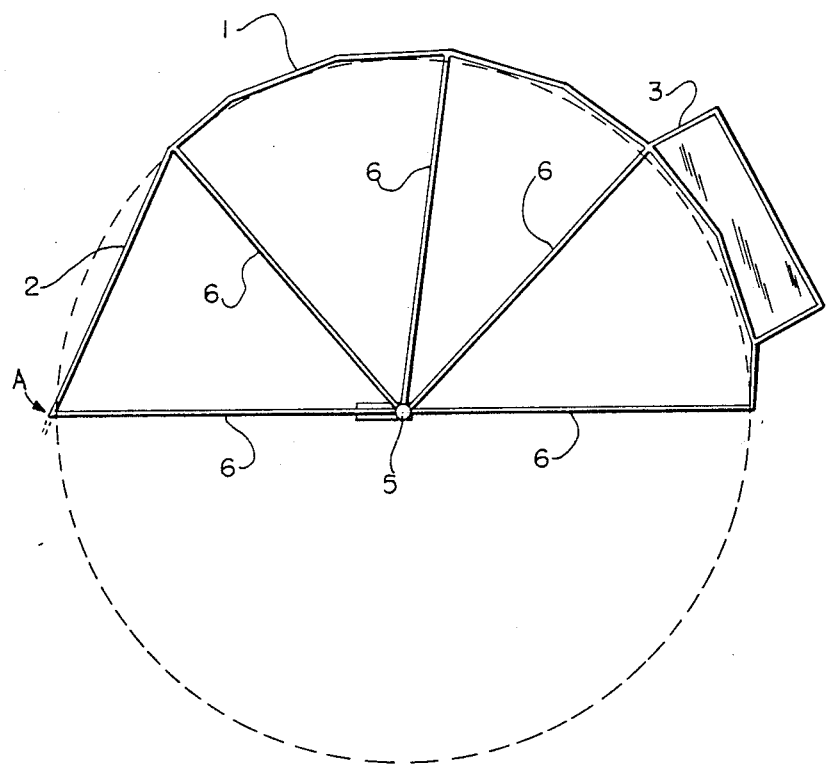
FIG. 1 is a plan view of the automatic trapping apparatus.

As illustrated in FIG. 1, trapping apparatus according to this embodiment of the invention comprises a first barrier 1 extending around an arcuate periphery. The barrier is suitably in the form of prefabricated panels which may be releasably connected together in situ, for example, and dismantled when the trapping apparatus is not required or is required at another location. The barrier 1 includes an opening 2 for entry of livestock and may include feeds means illustrated at 3. The ends of arcuate barrier 1 are connected to fencing to provide an enclosed area defined by the fencing and the ends of barrier 1. A gate 4 extends between the ends of the arcuate barrier 1 and is supported on vertical support 5 for rotation about a vertical axis. A second peripheral barrier extends between the end A of the arcuate barrier adjacent the opening 2 and support 5. Barrier 1 is suitably connected to vertical support 5 by overhead radial members 6 to provide additional stability.

Figure 2:
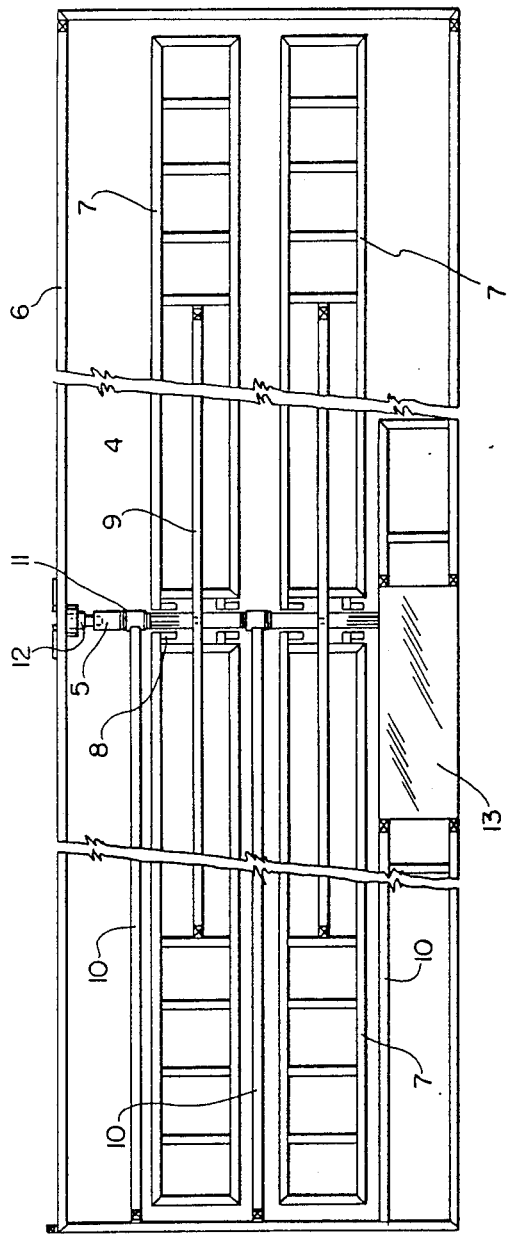
FIG. 2 is a front elevation of a gate mechanism according to the trapping apparatus illustrated in FIG. 1.
Figure 3:
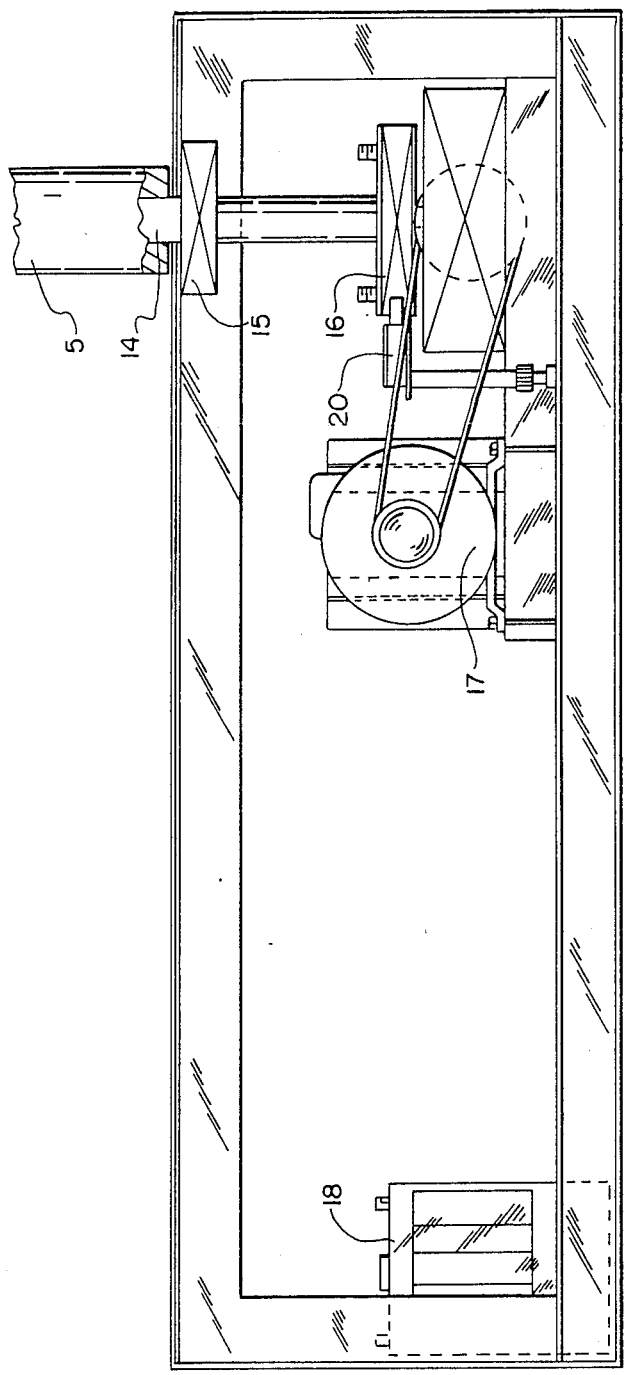
FIG. 3 is a side view of the gate actuating mechanism.

As illustrated in FIG. 2, gate 4 comprises a number of substantially radial leaves 7 attached to vertical post 5 which may suitably be a tubular member. Individual leaves may be supported on post 5 by diametrically spaced sleeves 8 rigidly attached to post 5 and engaging with downwardly extending lugs on each leaf. Opposed leaves may be retained in substantially diametrical relation and fixed radial position by longitudinal members 9 releasably attached to each leaf by, for example, a sleeve and pin connection engaging each end of the members 9.

The second peripheral barrier extending between an end A of arcuate barrier 1 and vertical post 5 may be formed of horizontal rails 10 connected at one end to an end A of barrier 1 adjacent opening 2 and rotatably engaging post 5 by circumferential sleeves 11 connected to the other ends of the rails. Post 5 may include radial bearings to support sleeves 11 if desired. Rails 10 are arranged to permit leaves 7 to rotate through 360 degrees. Post 5 may rotatably engage a pin 12 connected to a member engaging the inner ends of arm 6 and thus serves to provide vertical support for arms 6 while the arms provide radial support for post 5.

Vertical post 5 is mounted on an actuating assembly 13. This assembly includes shaft 14 which is non-rotatably connected to post 5, for example, by splines and is supported for rotation in bearing 15. Shaft 14 is connected to clutch means 16 which is further connected to reducing gear means 20 driven by belt or other drive means by motor 17.

As illustrated in FIG. 2, gate 4, the peripheral barrier between vertical post 5, and actuating assembly 13 are conveniently constructed as a demountable assembly having a peripheral frame which may be attached to the ends of barrier 1.

Figure 4:
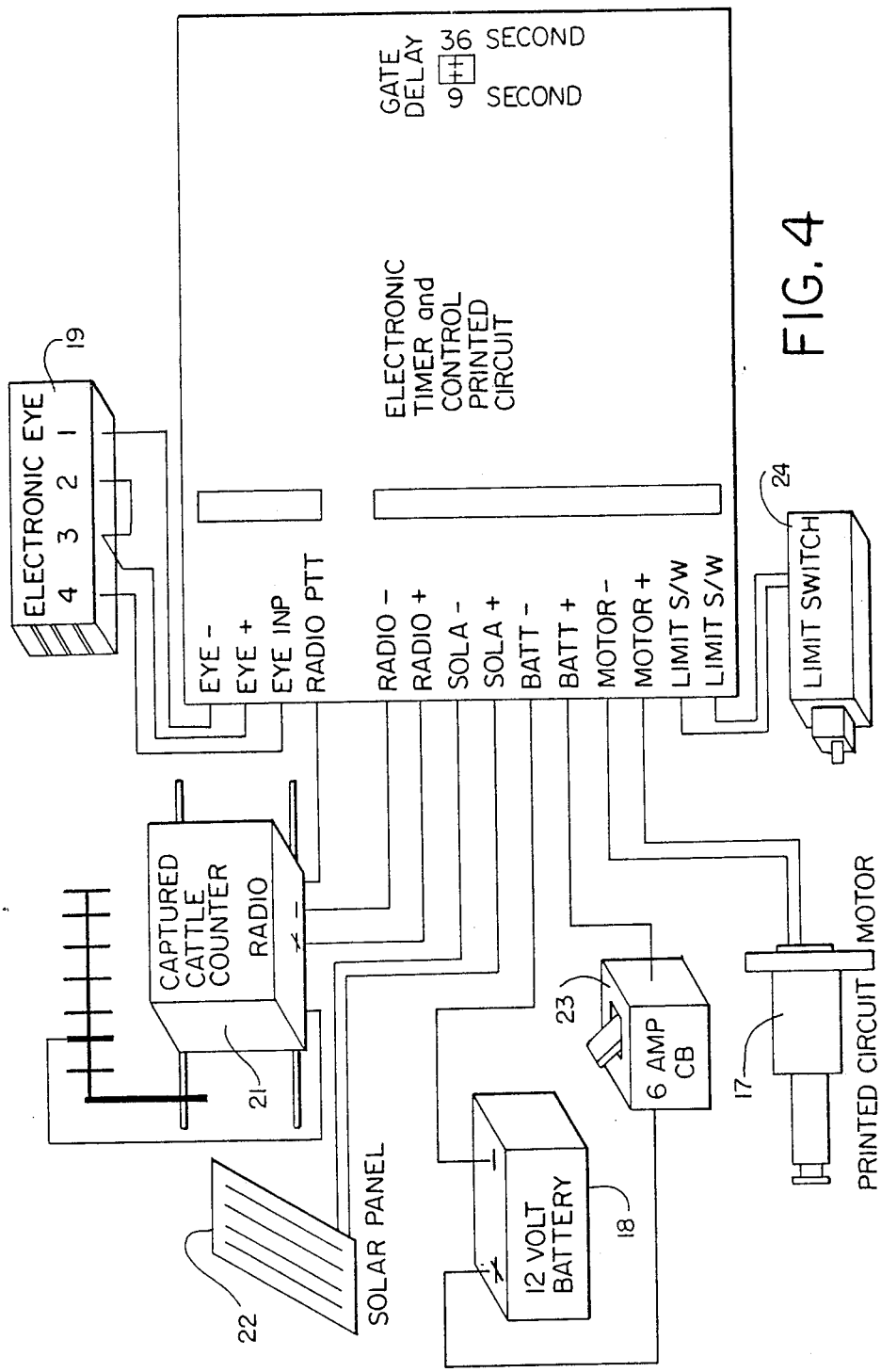
FIG. 4 is a circuit diagram for the automatic actuating mechanism illustrated in FIG. 3.

Motor 17 is actuated by the circuitry illustrated in FIG. 4. As will be seen from that figure motor 17 is operated by battery 18, the motor being actuated by a signal generated by an animal detection means comprising an electronic eye 19. Actuation of motor 17 causes rotation of gate 4, one side of which moves into the area bounded by barrier 1 and across opening 2 thereby preventing egress of animals through that opening. Limit switch 24 disconnects power to the motor when the gate has rotated through 180 degrees forcing animals out of the trapping apparatus.

Counter means 21 is provided to count animals trapped by the apparatus and is connected to a radio transmission means. Solar panels 22 may be also provided to energize battery 18 and/or supply power to the radio transmitter and detector. As illustrated, a circuit breaker 23 is included in the power supply circuit to prevent damage to other circuitry which is conveniently in the form of a printed circuit.

We claim:

1. Automatic trapping apparatus for trapping livestock comprising first barrier means extending part way around a periphery, gate means rotatably mounted on support means located mid-way between the ends of said first barrier means for rotation about a vertical axis, said gate means comprising a first one or more leaves extending between said support means and one end of said first barrier means and a second one or more leaves extending between said support means and the other end of said first barrier means, an inlet in said first barrier means to admit livestock within the area bounded by said first barrier means and said gate means, second barrier means extending between said one end of said first barrier means and said support means and arranged to allow passage therethrough of said gate means when said gate means is rotated, detector means to detect the presence of livestock within the area bounded by said first barrier means and said gate means, actuator means to rotate said gate means on detection of livestock within said area whereby when livestock are detected by said detector means, said gate means rotates with said second one or more leaves moving outwardly of said area bounded by said first and second barrier means to provide an outlet from said area and said first one or more leaves moves across said bounded area closing said inlet and forcing livestock located in said bounded area through the opening provided by the outward movement of said second one or more leaves.

2. Automatic trapping apparatus as claimed in claim 1 wherein said inlet is adjacent said one end of said first barrier means.

3. Automatic trapping apparatus as claimed in claim 2 wherein said first barrier means includes livestock feed means adjacent said other end of said first barrier means.

4. Automatic trapping apparatus as claimed in claim 1 wherein said support means is a rotatable tubular column and said leaves are removably supported on said column by sleeves rigidly affixed to said column and engaging with downwardly projecting lugs located on the inner end of each leaf, opposed leaves being retained in fixed radial relation by a beam detachably connected at its ends to said opposed leaves.

5. Automatic trapping apparatus as claimed in claim 1 wherein said gate means is rotated by drive means connected to said support means.

6. Automatic trapping apparatus as claimed in claim 5 wherein said drive means includes a limit switch whereby said gate is rotated through an angle of approximately 180 degrees to reverse the positions of said first and second one or more leaves.

7. Automatic trapping apparatus as claimed in claim 6 wherein said drive means includes clutch means such that said gate means exerts a predetermined pressure on livestock engaged by the gate means during rotation.

* * * * *